United States Patent [19]

Stevens

[11] Patent Number: 4,864,610
[45] Date of Patent: Sep. 5, 1989

[54] EARPIECE FOR A TELEPHONE HEADSET

[75] Inventor: Toni R. Stevens, Felton, Calif.

[73] Assignee: ACS Communications, Inc., Scotts Valley, Calif.

[21] Appl. No.: 19,748

[22] Filed: Feb. 27, 1987

[51] Int. Cl.⁴ .............................................. H04R 1/10
[52] U.S. Cl. ................................... 379/431; 181/130; 181/135; 379/430; 381/187
[58] Field of Search .................. 379/430, 431; 381/25, 381/74, 187, 183, 67; 181/130, 131, 135, 132, 20; 128/864, 867

[56] References Cited

U.S. PATENT DOCUMENTS

| | | | |
|---|---|---|---|
| 3,169,600 | 2/1965 | Thomas | 181/135 |
| 3,280,273 | 10/1966 | Flygstad et al. | 379/430 |
| 3,539,032 | 11/1970 | Scanlon | 181/135 |
| 3,548,118 | 12/1970 | Hutchings | 379/430 |
| 3,610,841 | 10/1971 | Hutchings | 381/68.7 X |
| 3,667,569 | 6/1972 | Mackey et al. | 181/131 |
| 3,691,319 | 9/1972 | Bee | 379/430 |
| 3,984,645 | 10/1976 | Kresch | 379/430 |
| 3,993,879 | 11/1976 | Larkin | 379/430 |
| 4,039,765 | 8/1977 | Tichy et al. | 379/430 |
| 4,273,969 | 6/1981 | Foley et al. | 379/430 |
| 4,335,281 | 6/1982 | Scott et al. | 379/430 |
| 4,347,911 | 9/1982 | Bertagna et al. | 181/131 |
| 4,420,657 | 12/1983 | Larkin | 379/430 |
| 4,617,431 | 10/1986 | Scott et al. | 381/154 |
| 4,668,842 | 5/1987 | Yokoyama et al. | 381/183 |
| 4,720,857 | 1/1988 | Burris et al. | 381/187 |
| 4,724,922 | 2/1988 | Kalayjian | 181/135 |

FOREIGN PATENT DOCUMENTS

| | | | |
|---|---|---|---|
| 3210034 | 9/1982 | Fed. Rep. of Germany | 381/187 |
| 3210165 | 5/1983 | Fed. Rep. of Germany | 381/187 |
| 0017295 | 1/1982 | Japan | 381/187 |
| 0017296 | 1/1982 | Japan | 381/187 |
| 2068681 | 8/1981 | United Kingdom | 381/187 |
| 2082020 | 2/1982 | United Kingdom | 381/187 |

Primary Examiner—Jin F. Ng
Assistant Examiner—Danita R. Byrd
Attorney, Agent, or Firm—Limbach, Limbach & Sutton

[57] ABSTRACT

An earpiece for use with a post-auricle communication headset is disclosed. The headset includes a capsule to which a microphone boom and the earpiece are affixed. The earpiece is composed of a flexible sound tube terminating in a sound tip surrounded by a conically shaped ear cushion. The sound tube includes an acoustically sealed swivel joint functioning to facilitate the secure positioning of the ear cushion in the user's ear. The cushion is composed of a compressible foam material and is configured so that the sound tip is not in contact with the user's ear thereby reducing irritation and dissipating sound surges.

14 Claims, 1 Drawing Sheet

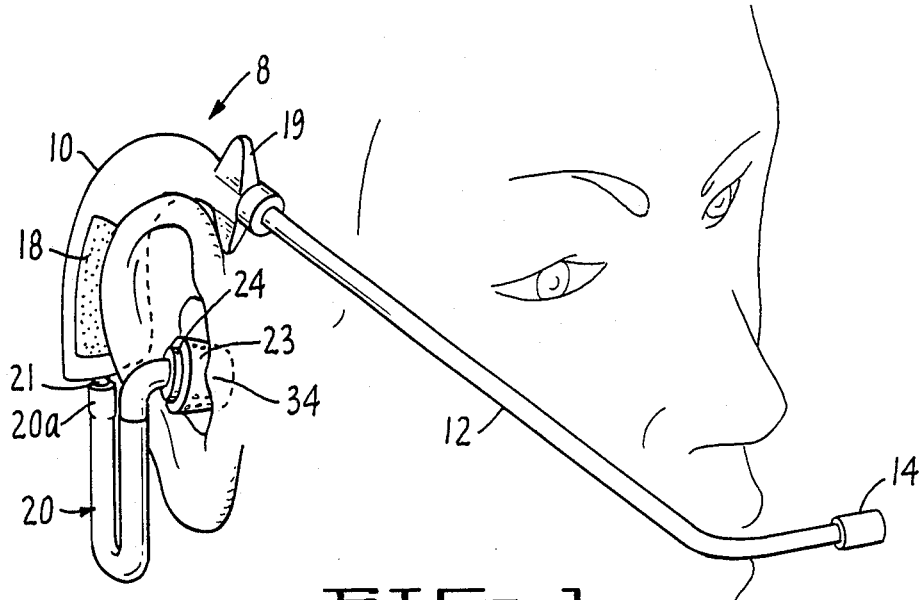
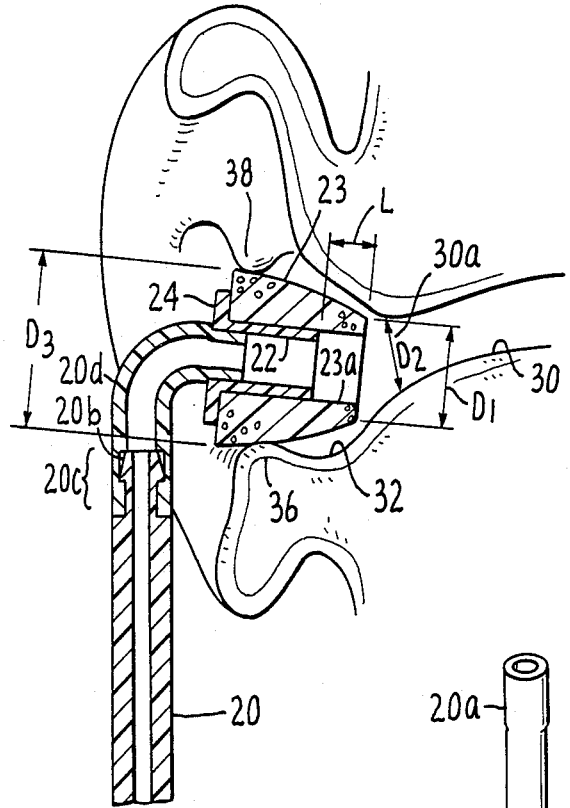
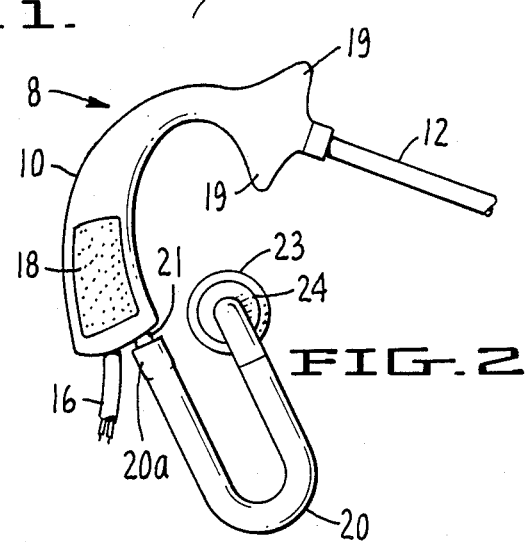
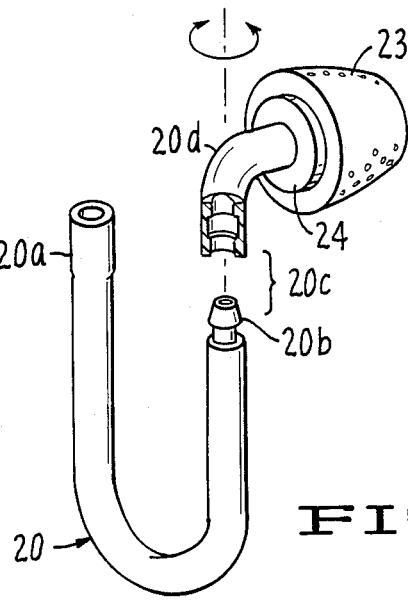
FIG. 1.
FIG. 2.
FIG. 3.
FIG. 4.

EARPIECE FOR A TELEPHONE HEADSET

TECHNICAL FIELD

This invention relates to an earpiece to be worn with a post-auricle, or "over-the-ear" headset of the type used for two-way audio communication.

BACKGROUND OF THE INVENTION

A variety of headsets have been developed for use with telephone systems. The primary users of these headsets are attendants such as receptionists, switchboard operators and reservation clerks who spend a majority of the day speaking on the telephone. These headsets allow the wearer free use of the hands and avoid the discomfort of balancing a cumbersome handset against the ear.

The prior art headsets consist of two principle types. U.S. Pat. No. 3,548,118 issued Dec. 15, 1970 and U.S. Pat. No. 3,610,841 issued Oct. 5, 1971, both to Hutchings, disclose post-auricle or "over-the-ear" type headsets. These headsets are designed so that the receiver and microphone transducers are housed in a lightweight capsule configured with an accurately shaped surface suitable for wear behind the user's ear. U.S. Pat. No. 4,617,431 issued Oct. 14, 1986 to Scott et al. discloses a rotatable voice tube assembly for use with such headsets. U.S. Pat. No. 4,420,657 issued Dec. 13, 1983 to Larkin discloses another popular headset design. This latter design includes a wire headband for affixing the headset to the user.

Post-auricle headsets of the type described above utilize a sound tube to transmit the sonic vibrations generated by the receiver transducer to the ear of the user. The sound tube typically terminates in a vinyl ear plug. This ear plug is worn inside the auditory canal of the user's ear, sealing off the entrance of the outer ear canal.

These sound tubes suffer from several shortcomings. For example, current construction of the sound tube prevents optimum positioning of the ear plug in the user's ear because the angle of entrance to the auditory canal differs for each individual. Additionally, because the headset can be worn over either ear, the sound tube must twist to accommodate the two mirror image positions. Thus the tip tends to slip out of place unless it is positioned firmly in the ear.

Another problem inherent in the prior art ear plugs relates to possible high voltage surges. Specifically, atmospheric disturbances frequently cause high voltage surges to be introduced into the phone line. These surges are often painful to the user and can cause damage to the eardrum since the entire force of the sound is channelled directly to the ear drum via the sound tube and the ear plug which seals the ear canal.

Additionally, continual use of the snug fitting ear plug can give rise to ear infections and skin irritations. These problems have caused many users to switch to the banded, "over-the-head," headset where the cushioned earpiece rests on the outside surface of the user's ear. (See U.S. Pat. 4,420,657, cited above). Many users, however, find that the banded headset interferes with certain hair styles and would prefer the post auricle design were it not for the presently used ear plugs.

SUMMARY OF THE INVENTION

Accordingly, it is an object of the present invention to provide a new and improved earpiece for use with a post-auricle headset that has the same comfort and protection of an externally worn ear cushion.

It is another object of the subject invention to provide a new and improved earpiece which self centers at the entrance to the auditory canal of the user while minimizing the undesirable effects of voltage surges and reducing the likelihood of infection.

It is a further object of the present invention to provide a new and improved sound tube which allows for secure positioning of the earpiece in the user's ear.

These and other objects of the invention are accomplished by use of an earpiece composed of a flexible sound tube terminating in a sound tip. Preferably, the sound tube includes an acoustically sealed swivel joint to facilitate comfort and positioning of the earpiece for individual) users.

The sound tip is surrounded by a conically shaped ear cushion made of a compressible foam material, preferably suitable for dissipating sound. The ear cushion tapers to a diameter corresponding to the diameter of the entrance to the auditory canal of the user's ear. The remainder of the cushion is sized such that it fits within and is supported by the cartilage of the outer ear. By this arrangement, the earpiece tends to self-center in the outer ear with the sound tip being securely maintained near the entrance to the auditory canal without undue force or pressure.

Preferably, the ear cushion projects beyond the distal end of the sound tip. This configuration prevents contact between the sound tip and the entrance to the auditory canal thereby reducing the likelihood of infection and permitting dissipation of sound surges.

In the preferred embodiment, the proximal end of the sound tube attaches to a compatible post-auricle headset. The headset includes a receiver element housed in a post-auricle capsule for converting sound waves into electrical signals. A microphone boom is connected to the capsule which houses a means for converting sound waves to electrical signals.

Further objects and advantages of the subject invention will become apparent from the following detailed description when taken in conjunction with the drawings.

BRIEF DESCRIPTION OF THE DRAWINGS

FIG. 1 is a perspective view of the preferred embodiment of the new and improved post-auricle headset and earpiece being worn by a user.

FIG. 2 is a side elevational view of the postauricle headset of the subject invention.

FIG. 3 is a fragmentary cross sectional view of the subject invention illustrating both the positioning of an ear cushion within a user's ear and the relationship between an ear cushion, sound tip and sound tube the present invention.

FIG. 4 is an exploded perspective view, partially in section, illustrating a sound tube according to the present invention.

DETAILED DESCRIPTION OF THE PREFERRED EMBODIMENTS

Referring generally to FIG. 1 and 2, a headset 8 is illustrated. Headset 8 includes a post auricle capsule 10 for housing a receiver element (not shown) for converting electrical signals into sound waves audible to the user. The capsule 10 also houses a microphone transducer (not shown) for converting sound waves into electrical signals. An open ended sound boom 12 is acoustically coupled to the capsule 10. In an alternative embodiment, the microphone transducer can be mounted at the distal end of the sound boom 14. In the latter case, conductive wires (not shown) are used to convert the microphone transducer to the capsule 10. A set of wires 16 (FIG. 2) extend from the capsule to a standard amplifier module (not shown) and then to the telephone.

In the preferred embodiment, the capsule includes a pair of opposed compliant pads 18. pads 18 mold to the shape of the user's mastoid process for added comfort. In addition, a pair of projecting fins 19 can be provided to add stability. Both of the latter features, as well as the internal structure of the capsule, are described in co-pending application Ser. No. 919,768, filed Nov. 16, 1986, now abandoned assigned to the same assignee as the subject invention and incorporated herein by reference.

In order to permit sound waves generated by the receiver element (not shown) to travel directly to the wearer's ear, a sound tube 20 is acoustically coupled to the receiver element. Capsule 10 is provided with a projecting tubular segment 21 so that the end 20A of sound tube 20 may be easily attached and detached facilitating interchangeability of earpieces for individual users. In this manner, the spread of infection can be reduced. The sound tube 20 terminates in a sound tip 22 as illustrated in FIG. 3. The sound tip 22 is surrounded by a conically shaped ear cushion 23, which may be formed from a polyurethane compressed foam or any other material suitable for dissipating sound.

As illustrated in FIGS. 3 and 4, the sound tube 20 curves upward to an acoustically sealed swivel joint 20c. The joint is formed by a male connector 20b that fits snugly into a matching female connector 20d. The swivel joint 20c permits free rotation of the sound tube 20 to allow for comfortable and secure positioning of the ear-tip assembly by each individual user. The rotation provided by the swivel joint 20c also permits the headset to be worn over either ear. This design eliminates the twisting that occurs in the prior art sound tubes to accommodate the mirror image positions. The sound tube may be composed of a flexible PVC tubing.

In the preferred embodiment the sound tip 22 is a separate hollow element that attaches to the sound tube 20. The sound tip 22 channels sound from the sound tube directly into the user's ear. The sound tip may be composed of vinyl plastisol or any suitable flexible material. The sound tip may include a circular washer 24 located at the juncture where the sound tube 20 meets the sound tip 22. Washer 24 inhibits movement of the ear cushion 23 relative to the sound tip 22 and aids in positioning the ear cushion in the wearer's auditory canal. The washer 24 may be composed of vinyl plastisol or any other suitable material.

The conically shaped ear cushion 23 surrounds and is preferably glued to the ear tip 22. As shown in FIG. 3, the distal end 23a of the cushion 23 projects beyond the ear tip 22 an amount L. In the preferred embodiment the length L is equal to about 0.05 inches. The distal end 23a of cushion 23 has a diameter $D_1$ corresponding to the diameter $D_2$ of the entrance 30a to the auditory canal 30. In the commercial product, a diameter of 0.30 inches has been selected.

The configuration of the remainder of cushion 23 is selected so that it will fit within of the outer ear of or more specifically, the cavum concha 32-of the outer ear while being supported by the surrounding cartilage. As shown in FIGS. 1 and 3, the outer surface of the cushion is wedged between the tragus 34, the antitragus 36. and the curs of the helix 38.

In the commercial product, a few different size cushions are offered because the size of the cavum concha 32 varies from person to person. The diameter $D_3$ of the larger proximal side of the cushion ranges from 0.43 to 0.63 inches. Since the diameter of the opening 30a to the auditory canal 30 varies less from person to person, the distal end 23a of each cushion has the same diameter. The length of each cushion is 0.5 inches.

The configuration of the ear cushion provides significant advantages over the prior art. Specifically, the ear cushion 23 will tend to self-center and be supported by the cartilage of the outer ear with the sound tube being located near the entrance 30a to the auditory canal 30. In this manner, acoustic characteristics similar to the prior art ear plugs can be attained.

In addition, the distal end of the cushion 23a projects beyond the of the sound tip an amount L. Where the cushion 23 is formed from a material that transmits sound, loud sonic surges can be partially dissipated through the cushion rather that being channelled directly into the auditory canal. In this manner, the concussive impact on the eardrum can be reduced.

It should be understood that while the subject invention has been disclosed with reference to a preferred embodiment, various alternatives to the structure herein may be employed in practicing the present invention. It is intended that the following claims define the invention, and that the structure within the scope of these claims and their equivalents be covered thereby.

I claim:

1. An earpiece for use with a communication device comprising:

a flexible sound tube with one end thereof acoustically coupled to a communication device and with the other end terminating in a sound tip; and a conically shaped ear cushion formed from a compressible foam material mounted around said tip, with the distal end of said cushion tapering to a diameter corresponding to the diameter of the entrance to the auditory canal of a user's ear, and the proximal end of said cushion having a diameter corresponding to the diameter of the cavum concha of the user's ear, whereby said ear cushion will tend to self-center in the user's ear, with the sound tip being maintained near the entrance to the auditory canal without force or pressure, said ear cushion being supported only by cartilage of the outer ear.

2. An earpiece as recited in claim 1 wherein said ear cushion is constructed to dissipate sound.

3. An earpiece as recited in claim 2 wherein the distal end of said ear cushion projects beyond the distal end of said sound tip thus preventing contact between the sound tip and the entrance to the auditory canal of the user's ear, thereby reducing the likelihood of infection and permitting dissipation of sound surges.

4. An earpiece as recited in claim 1 wherein said sound tube includes an acoustically sealed swivel joint, said swivel joint facilitating the secure positioning of said earpiece for each individual user.

5. An earpiece as recited in claim 1 wherein said sound tip is a hollow, separate element connected to said sound tube, said tip permitting sound to pass from the sound tube to the user's ear canal.

6. An earpiece as recited in claim 1 wherein said sound tip includes a circular washer formed on the proximal end thereof to inhibit movement of said ear cushion relative to said sound tip.

7. An earpiece as recited in claim 1 wherein one end of said sound tube includes means for attachment to a compatible communication device.

8. A communication headset comprising:

a post-auricle capsule;

a receiver element housed in said capsule for converting a electrical signals into sound waves audible to the user;

a microphone element for converting sound waves into electrical signals;

an elongated sound boom connected to said capsule and extending towards the mouth of the user;

an earpiece acoustically coupled to said capsule, said earpiece including a flexible sound tube with one end thereof acoustically coupled to said receiver element and the other end terminating in a sound tip, said sound tip surrounded by a conically shaped ear cushion formed from a compressible foam material with the distal end of said cushion tapering to a diameter corresponding to the diameter of the entrance the auditory canal of a user's ear, and the proximal end of said cushion having a diameter corresponding to the diameter of the cavum concha of the user's ear, whereby said ear cushion will tend to self-center in the user's outer ear, with the sound tip being maintained near the entrance to the auditory canal without force or pressure, said ear cushion being supported only by the cartilage of the outer ear.

9. A communication headset as recited in claim 8 wherein said ear cushion is constructed to dissipate sound.

10. A communication headset as recited in claim 9 wherein the distal end of said ear cushion projects beyond the distal end of said sound tip thus presenting contact between the sound tip and the entrance to the auditory canal of the user's ear, thereby reducing the likelihood of infection and permitting dissipation of sound surges.

11. A communication headset as recited in claim 8 wherein said sound tube includes an acoustically sealed swivel joint, said swivel joint facilitating the secure positioning of said earpiece for each individual user.

12. A communication headset as recited in claim 8 wherein said sound tip is a hollow, separate element connected to said sound tube, said tip permitting sound to pass from the sound tube to the user's ear canal.

13. A communication headset as recited in claim 8 wherein said sound tip includes a circular washer formed on the proximal end thereof to inhibit movement of said ear cushion relative to said sound tip.

14. A communication headset as recited in claim 8 wherein one end of said sound tube includes means for attachment to a compatible communication device.

* * * * *